Aug. 12, 1947.    L. M. PUSTER    2,425,439
TEMPERATURE REGULATOR
Filed Oct. 21, 1942    4 Sheets-Sheet 1

Inventor
Louis M. Puster
By Cameron, Kerkam + Sutton
Attorneys

Inventor
Louis M. Puster
By Cameron, Kerkam + Sutton
Attorneys

Aug. 12, 1947.    L. M. PUSTER    2,425,439
TEMPERATURE REGULATOR
Filed Oct. 21, 1942    4 Sheets-Sheet 4

Inventor
*Louis M. Puster*

By *Cameron, Kerkam + Sutton*
Attorneys

Patented Aug. 12, 1947

2,425,439

UNITED STATES PATENT OFFICE 2,425,439

TEMPERATURE REGULATOR

Louis M. Puster, Knoxville, Tenn., assignor to The Fulton Sylphon Company, Knoxville, Tenn., a corporation of Delaware Application October 21, 1942, Serial No. 462,845

11 Claims. (Cl. 236—34)

This invention relates to temperature regulators for the cooling systems of internal combustion engines, and more particularly to regulators for controlling the flow of cooling medium through a cooling system of the type employing a by-pass around the radiator through which the circulation is maintained when the temperature of the cooling medium is below a predetermined degree. While applicable to cooling systems for surface vehicles and installations, as will be hereinafter apparent, the present invention is of particular utility when applied to the cooling systems of liquid cooled airplane engines.

Cooling systems of the type employing a by-pass through which circulation is maintained during the warming up period of the engine, and before the cooling medium reaches a predetermined degree, have the recognized advantage that much time may be saved in bringing the engine to that temperature at which it is designed to operate efficiently. Systems of this character of necessity entail valve control of the by-pass and of the main circulation through the radiator, involving the use of a thermostat which, in order to provide for the requisite amount of valve movement, is ordinarily of the type employing an expansible and collapsible chamber responsive to variations in pressure generated therein by a volatile liquid. Such expansible and collapsible chambers being pressure responsive elements also respond to fluctuations of pressure exteriorly thereof. Thus a designed operation at ground level ceases to hold true when a plane has reached high altitudes because the decrease in atmospheric pressure acting on the cooling medium decreases the external pressure on the pressure responsive vessel, whereby the latter can respond to a lower interior pressure. As a plane will operate at a wide variety of altitudes each having its own atmospheric pressure, the variations in pressure on the liquid in the cooling system are accordingly productive of a constantly varying back pressure on the thermostat with a consequent variation in the temperature response thereof. Furthermore, the thermostat is also responsive to variations of pressure in the cooling liquid itself arising from varying conditions of operation of the pump, valves, etc. Hence the combined effect of the varying pressures on the thermostat may seriously interfere with the designed operation of the regulator, causing, for example, in some structures heretofore proposed, the by-pass valve member to float out of contact with its seat and permit a continuous flow of the cooling medium through the by-pass even though that temperature has been attained wherein only circulation through the radiator is desired.

It is an object of this invention to provide a temperature regulator of the character referred to wherein the operation of the valve mechanism is independent of fluctuations of pressure in the cooling liquid whether caused by variations of atmospheric pressure due to altitude or by variations in the pressure in the liquid caused by the operation of the cooling system itself.

Another object of this invention is to provide a device of the type characterized which associates with the thermostat controlling the valve operation a compensating means which balances out variations in the pressure of the cooling medium on the thermostat.

Another object of this invention is to provide a device of the type characterized which assures a substantially constant pressure drop through the thermostatically controlled valve mechanism irrespective of the varying positions of the valve members with respect to their seats.

Another object of this invention is to provide a device of the type last characterized which employs a pair of thermostatically controlled valve members that co-operate with their respective seats to initiate or terminate circulation of the cooling medium at different times but with the effect that the total flow of cooling medium remains substantially constant irrespective of the varying relationships of the valve members with respect to their seats.

Another object of this invention is to provide a device wherein the flow of cooling medium remains substantially constant without use of sequentially opening or closing valves as last referred to.

Another object of this invention is to provide a temperature regulator for a cooling system of an internal combustion engine which has improved safety mechanism to discontinue further flow through the by-pass when a dangerous temperature has been reached, and which while particularly adapted for use in a regulator as hereinbefore characterized is also of general utility in introducing a safety feature into temperature regulators of the by-pass type, this subject matter being claimed in divisional application Serial No. 548,404, filed August 7, 1944.

Another object of this invention is to provide a device as heretofore characterized which is relatively simple and compact in structure, and which can be manufactured and installed at relatively low cost, and which at the same time is highly efficient in service.

Other objects of the invention will appear as the description of the invention proceeds.

The invention is capable of receiving a variety of mechanical expressions, three of which have been illustrated on the accompanying drawings, but it is to be expressly understood that the drawings are for purposes of illustration only and are not to be construed as definitions of the limits of the invention, reference being had to the appended claims for that purpose.

Referring in detail to the drawings, wherein the same reference characters are employed to designate corresponding parts in the several figures, Fig. 1 is a schematic view of a cooling system of an internal combustion engine embodying the invention;

Figure 1:
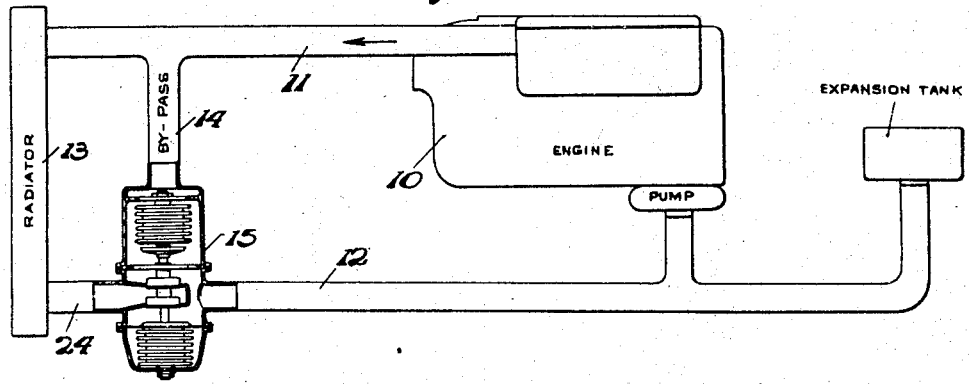

Referring first to Fig. 1, there is diagrammatically illustrated a cooling system for an internal combustion engine 10 which includes upper water line 11 and lower water line 12 in communication with any suitable radiator 13. Interposed between the upper water line 11 and the bottom water line 12 is a by-pass 14, and at the junction of said by-pass with the bottom water line as here shown is installed in any suitable way a regulator 15 embodying the present invention, this particular embodiment therefore being particularly adapted for installation in a bottom water line.

Figure 2:
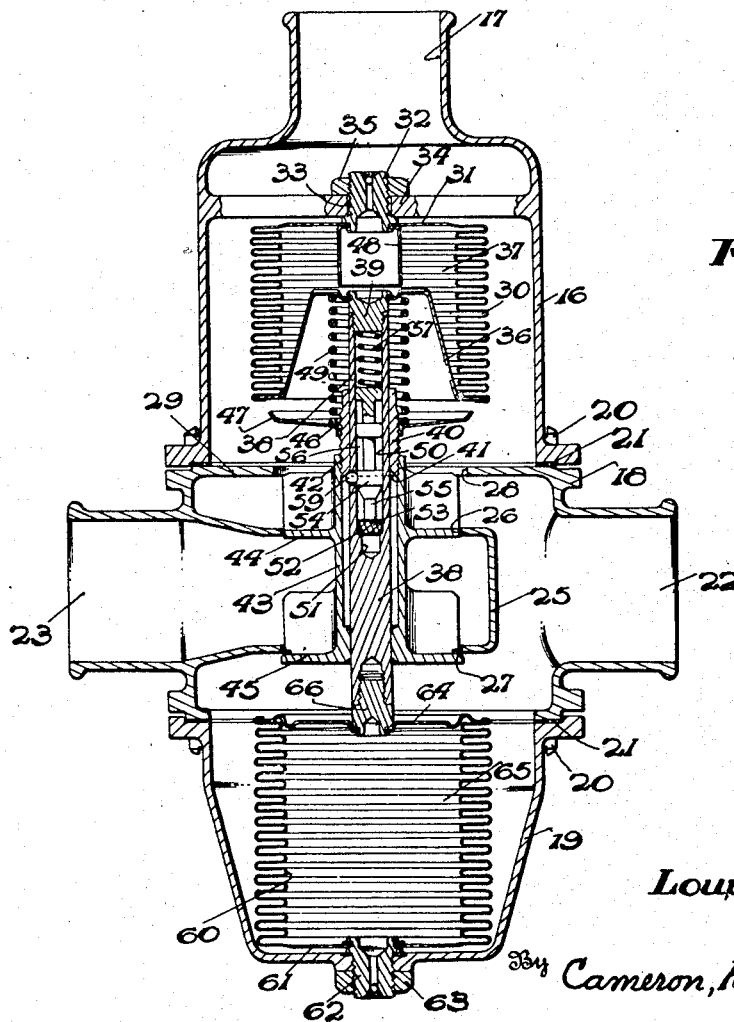
Fig. 2 is an enlarged and more detailed view of the regulator illustrated generally in the embodiment of Fig. 1.

Referring now to the more detailed illustration of the embodiment of the regulator of Fig. 1 to be found in Fig. 2, the regulator as here illustrated includes a housing which may be composed of any suitable number of parts, shown as composed of a cup-shaped section 16 having an inlet 17 for suitable attachment to and in communication with the by-pass 14, a central section 18 to be referred to in more detail, and a lower cup-shaped section 19 for the compensating element to be described. Said sections 16, 18 and 19 may be united in any suitable way, as by appropriate bolts or screws 20, with suitable packing 21, if desired, to prevent leakage at the joints between the sections of the housing.

Section 18 of said housing is provided with a pair of nipples 22 and 23, here shown as at opposite sides of the section and substantially in alignment, although such arrangement is in no respect essential. Nipple 22 is designed to be suitably attached to and communicate with the bottom water line 12, while nipple 23 is designed to be suitably attached to and communicate with the radiator 13, as by a short section of conduit designated 24 in Fig. 1, but obviously nipple 23 may be made of appropriate length for direct attachment to the outlet of the radiator. Interiorly, section 18 has a partition wall 25 apertured at 26 and 27 to provide a pair of aligned valve ports with which co-operate the main valve members to be described. Section 18 is also suitably provided with a by-pass port 28, here shown as formed in the wall 29 of section 18 on that side of said section to which the housing section 16 is attached.

Mounted in any suitable way in said housing section 16 is a thermostat of any suitable size and construction, here shown as in the form of an expansible and collapsible chamber defined by a corrugated tubular metal wall or bellows 30 provided with a stationary end wall 31 which is fixedly attached in position in the housing, as by a threaded boss 32 extending through an aperture 33 in a bridge 34 formed integrally with or attached to the housing section 16 and locked in position as by a nut 35. The opposite and movable end wall 36 closing the opposite end of the chamber 37 of said thermostat, and which chamber is charged with any suitable thermo-sensitive fluid, preferably a volatile liquid partially filling said chamber and effecting the expansion and contraction thereof upon changes in vapor pressure, has attached thereto in any suitable way a stem 38, here shown as hollow for a portion of its length for a reason to be explained, and illustrated as threadedly secured to a stud 39 projecting from the end wall 36. Slidingly mounted on said stem 38 but normally locked against relative movement with respect thereto as hereinafter explained is a sleeve 40 having its inner end beveled so as to provide a cam surface 41. Fixedly attached to the sleeve 40 in any suitable way, as by screw threads at 42, is a sleeve 43 which at its opposite end is also slidably mounted on said stem 38, and to said sleeve 43 is attached in any suitable way, or as shown made integral therewith, the valve members 44 and 45 for co-operation with the valve ports 26 and 27, respectively, heretofore referred to. As illustrated, valve member 44 has a sliding fit in its port 26, while valve member 45 has seating engagement with the periphery of the port 27, but as will be apparent any other suitable form of poppet valve structure may be employed.

Also mounted on the sleeve 40, as by the threaded connection at 46, is a by-pass valve 47, said valve having a diameter such that its effective area when closed is equal to the effective area of the movable end wall 36 of the thermostat chamber 37, to the end that said chamber and said valve member 47 will have the same response to fluid pressure whether the by-pass valve is open or closed as hereinafter explained. Valve member 47 may be of any suitable construction, being shown as somewhat dished so as to make a line contact with the periphery of the port 28, but any other suitable construction of seating valve may be used. Interposed between said valve member 47 and the end wall 36 of chamber 37, here shown as formed reentrantly so as to co-operate with the tubular stop element 48 to limit the collapse of the bellows 30, is a coil spring 49 for a purpose to be explained.

As before noted, stem 38 is hollow for a portion of its length to provide an interior bore 50. The inner end of said bore as shown is provided with a recess 51 above which is a seat 52 to receive a block 53 of suitable metal that will melt or at least become sufficiently soft to function as hereinafter explained if and when the temperature of the cooling medium reaches a predetermined degree that is considered dangerous. Slidably mounted in the bore 50 is a plunger which has a head 54 slidably engaged with the wall of said bore. Projecting from said head 54 is an extension 55, and outwardly from said head 54 said plunger is cut away as shown at 56. Mounted within the bore 50 between the end of the plunger and the stud 39 is a coil spring 57 which holds the extension 55 of the plunger in contact with the meltable block 53 and, when said block melts or sufficiently softens, forces the extension 55 toward or into the recess 51 so as to bring the cutaway portion 56 into the position previously occupied by the head 54. Mounted in an aperture in the wall of the stem 38 is a ball or other suitable trigger member 59, said ball being freely movable in said aperture but being normally held by the head 54 in a position in which it projects outwardly from the wall of the stem 38 in engagement with the cam surface 41 on the inner end of the sleeve 40, which relationship is maintained by the tension of the spring 49 applied to the valve member 47 and hence to said sleeve 40 to which said valve 47 is attached. Upon melting or softening of the block 53 sufficiently to permit spring 57 to move the head 54 on the plunger from the position shown in the drawings to one in which the cutaway portion 56 is brought opposite said ball 59, ball 59 is cammed into the cutaway portion 56 by the cam surface 41 of the sleeve 40 under the pressure applied to the latter by the spring 49, whereupon the stem 38 is disconnected from the sleeve 40 and the sleeve 43 with its valve members 44 and 45 carried thereby. Thereby the stem 38 becomes independent of the valve members 44 and 45, and as the sleeves 40 and 43 are now free to slide on the stem 38 they will be moved by spring 49 to the position wherein valve member 47 engages its seat to close the port 28, while valve members 44 and 45 are moved to open ports 26 and 27 to their maximum extent.

Mounted within the housing section 19, as hereinbefore referred to, is a pressure compensating element in the form of an expansible and collapsible corrugated tubular metal wall or bellows 60 having a stationary end wall 61 suitably attached to the housing wall, as by a stud 62 projecting through an aperture in the housing wall and secured in position by a nut 63. The opposite and movable end wall 64 of the chamber 65 defined peripherally by the bellows 60 is suitably attached to the stem 38 as by stud 66 having threaded engagement with the end of the stem 38. Thereby the movable end walls of the two chambers 37 and 65 are rigidly connected by the stem 38. End wall 64 has the same effective area as the end wall 36 of chamber 37, and chamber 65 is partially evacuated but with a charge of air or a suitable inert gas.

When valve member 47 is open so that the two movable end walls 36 and 64 are subjected to the fluid pressure in the housing the fluid pressure acts equally and oppositely on said two movable end walls connected by the stem 38, so that any fluctuation of pressure, whether due to changes in atmospheric pressure or due to changes in liquid pressure because of the operation of the cooling system, is balanced out since the same fluctuations of pressure are applied equally and in opposite directions on the movable end wall 36 of the thermostat and on the movable end wall 64 of the compensating chamber 65. When in the course of operation the valve member 47 is engaged with its seat, preventing or substantially preventing circulation of the cooling medium through the by-pass, the fluctuations in pressure in the medium flowing through the housing are applied to the movable end wall 64 of compensating chamber 65 and the underside of the valve member 47, but as the effective areas of the two movable end walls have been equated with that of the valve member 47, the same compensating effect is still retained. Hence in no position of the valve members will fluctuations of pressure in the cooling medium produce an undesired movement of said valve members because said valve members now respond only to the variations of pressure corresponding to temperature variations at the thermostat 37.

As will now be apparent, when the engine is first started the cooling medium is relatively cold and the thermostat 37 is contracted to the position shown wherein the main valve members 44 and 45 close the ports 26 and 27 in the main line of circulation through the radiator, while valve member 47 is wide open to permit the maximum circulation through port 28. When the temperature of the cooling medium rises to a predetermined degree thermostat 37 begins to expand, decreasing the flow of cooling medium through the port 28, and therefore through the by-pass, while initiating and progressively increasing the flow of cooling medium through ports 26 and 27 and thereby through the radiator. Progressive increase of temperature results in progressive movements of the valve members until the by-pass port 28 is closed and the main valve ports 26 and 27 are wide open, while a decrease in temperature results in a reverse movement of the parts to decrease the flow through the radiator and increase flow through the by-pass. Thereby the temperature of the cooling medium may be kept closely to the predetermined intended temperature.

In the event that the temperature rises dangerously to that degree at which the block 53 may melt or soften sufficiently to permit spring 57 to move the plunger 54, 55 downwardly as viewed in the drawings, ball 59 is cammed into the cutaway portion 56 under the action of the spring 49 and the valve members 44, 45 and 47 are thereby made independent of the stem 38. Under these conditions spring 49 is free to expand to its full limit until by-pass valve 47 closes the by-pass port 28 and the main valve members 44 and 45 are wide open, so as to enforce all further circulation through the radiator, with substantially no circulation through the by-pass, to obtain the maximum cooling effect of the radiator.

When the by-pass valve member 47 is closed the thermostat is in a confined body of water that is not subject to circulation, but if the temperature of the cooling medium starts to drop the water surrounding the thermostat will quickly lose heat through the walls of the housing and initiate the opening of the by-pass valve. However, if preferred, a leakage port may be provided in or around the valve member 47 so as to assure a slight circulation at all times through the chamber containing the thermostat and thereby render said thermostat more quickly responsive to changes of temperature in the cooling medium without introducing such circulation through the by-pass when the by-pass valve is closed as would upset the intended operation of the regulator.

Figure 3:
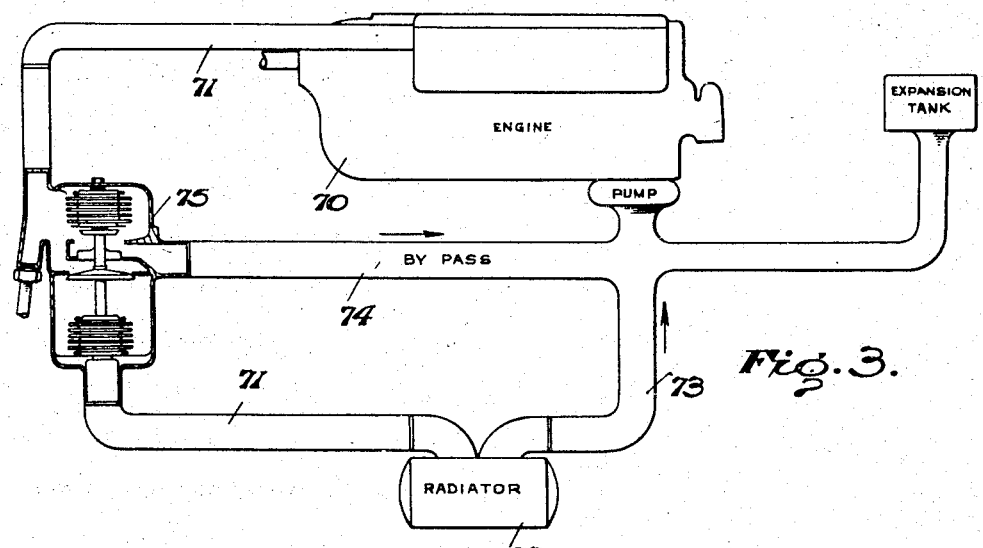
Fig. 3 is another schematic view of a cooling system of an internal combustion engine embodying the invention.

Fig. 3 illustrates another embodiment of the present invention applied to what corresponds with the upper water line of a cooling system. As here shown, engine 70 has a cooling water system including conduit 71 leading from the outlet of the engine jacket to the radiator 72, the cooling medium being returned to said jacket through water line 73. A by-pass 74 is interposed between water lines 71 and 73 and the regulator of the present invention, here designated 75, is interposed at the junction of the water line 71 with the by-pass 74. Thus this embodiment is one suitable for installation in an upper water line.

Figure 4:
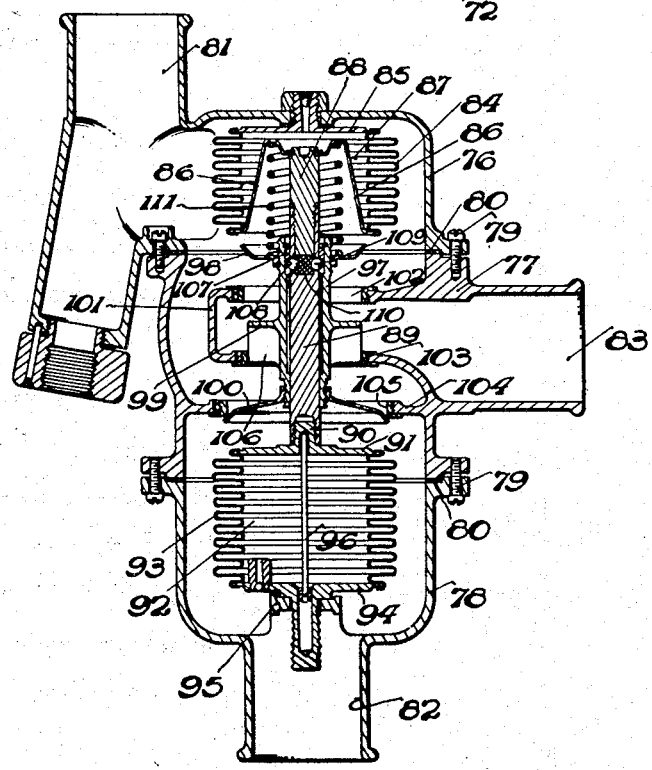
Fig. 4 is an enlarged and more detailed view of the regulator illustrated generally in the embodiment of Fig. 3.

Now referring to Fig. 4 for a detailed illustration of the embodiment of the invention diagrammatically indicated in Fig. 3, again the housing is shown as composed of three sections 76, 77 and 78 connected in any suitable way, as by bolts or screws 79 with or without interposed packing as illustrated at 80. In this embodiment the inlet 81, formed as a nipple on housing section 76, has suitable connection to and communication with the conduit 71 leading from the outlet of the water jacket, and outlet 82 for connection to and communication with the conduit 71 leading to the radiator is formed as a nipple on housing section 78. A nipple 83 on the housing section 77 is adapted to be suitably connected to and communicate with the by-pass 74. As in the embodiment of Fig. 2, the thermostat is illustrated as formed by an expansible and collapsible corrugated tubular metal wall or bellows 84 having a stationary end wall 85 suitably attached to the housing wall and a movable end wall 86, the chamber 87 thereby formed being suitably charged with a thermosensitive fluid, preferably a vaporizable liquid, as before explained. Fixed to said movable end wall 86 is a stud 88 to which is affixed the valve stem 89. At its opposite end valve stem 89 is affixed to a threaded stud 90 projecting from the movable end wall 91 of a pressure compensating vessel 92 having its peripheral wall formed by an expansible and collapsible tubular metal wall or bellows 93. The stationary end wall 94 of vessel 92 is fixedly mounted in position, as by means of a bridge 95 formed in or suitably attached to the wall of housing section 78, and said vessel 92 is charged as before explained. In the form here shown expansive and contractive movements of the vessel 92 are guided by a pin 96 fixed to one of the end walls of the vessel 92 and having its opposite end slidingly related with a recess suitably provided thereat. Thermostat 87 and compensating vessel 92 may be formed, mounted and charged as heretofore explained in greater detail in conjunction with the embodiment of Fig. 2.

Slidingly mounted on the stem 89 is a sleeve 97 to which are affixed or suitably formed integral therewith the valve members 98, 99 and 100, valve members 98 and 100 being shown as threadedly secured to the sleeve 97 while valve member 99 is shown as formed integrally with said sleeve. As in the embodiment of Fig. 2, housing section 77 is provided with an interior partition 101 provided with aligned apertures 102 and 103 to provide valve ports. In this embodiment removable threaded valve seat members are shown in said ports, but the ports could be formed by apertures in the partition as in the embodiment of Fig. 2, analogously as the embodiment of Fig. 2 could be provided with removable valve seat members if desired. The housing section 77 is also provided with a second partition 104 apertured to provide a valve port 105, here also shown as provided with a removable valve seat member. Valve members 98 and 100 are shown as adapted to make seating contact with the peripheries of the ports 102 and 105, respectively, but valve member 99 is of such size that it slides in the port 103, being illustrated as having wings 106 to guide the movements of said valve member with respect to port 103.

As is well understood in the art, the volume of flow through a valve port does not vary directly with the distance of the valve member from the port. Thus movement of the valve member toward its seat from its wide open position by 50% will only reduce liquid flow on the order of 20%. It will thus be perceived that in a construction such as here involved, if a predetermined flow of liquid is fixed by proper determination of the valve ports both when the by-pass valve is closed with the main valve wide open and when the main valve is closed with the by-pass valve wide open, the capacity for flow when said valve members are approximately half way between their extreme positions may be on the order of 160% of that existing before the by-pass valve starts to close and after it is fully closed. This in turn means that there is very material variation in pressure drop across the regulator during the periods when the valve members are in other than their extreme positions, because the capacity of the pump does not change with the capacity of flow through the regulator. It is highly desirable in order to attain the intended result of nice regulation of cooling medium flow in conformity with the variations in temperature that there be a substantially constant flow of liquid through the regulator irrespective of the position assumed by the valve members in the operation of the thermostat.

Figure 6:
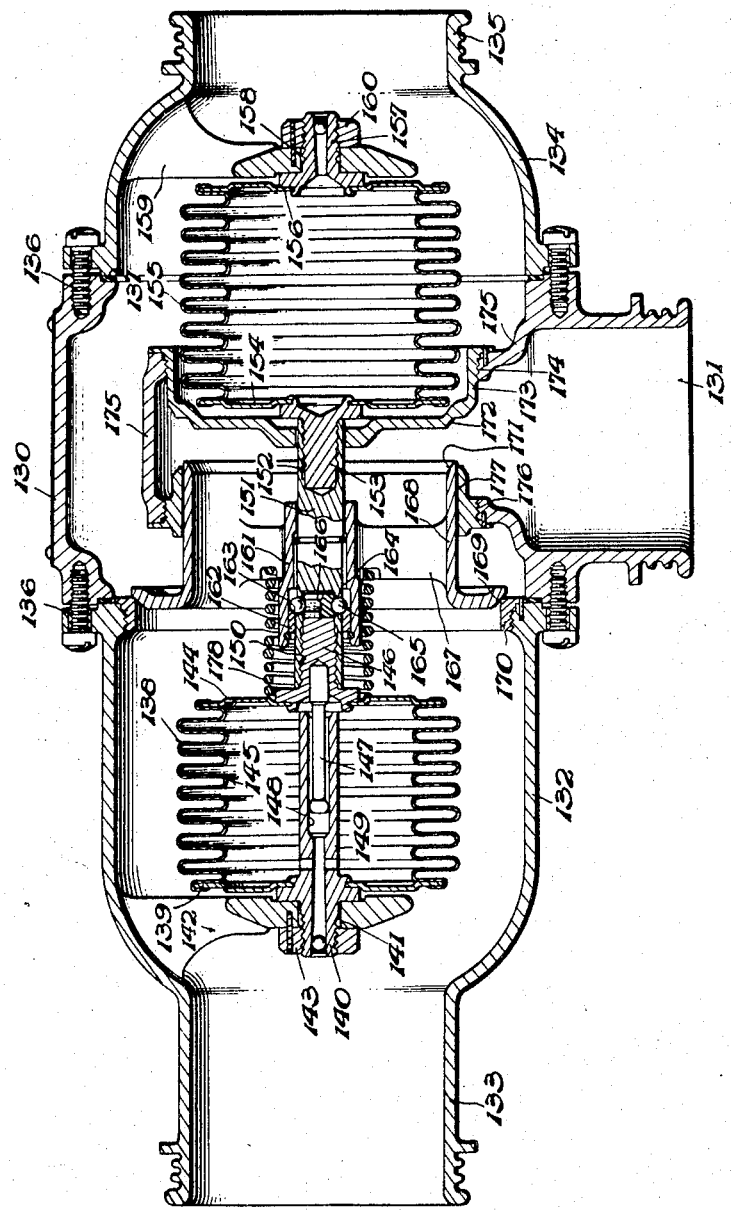
Fig. 6 illustrates yet another embodiment of the invention.

The present invention provides for the maintenance of a substantially constant flow of liquid through the regulator housing, and while the feature now to be described can be embodied in other structures than illustrated, as in the embodiment of Fig. 2, for example, and Fig. 6, the embodiment of Fig. 4 is here used to illustrate this capacity for a substantially constant volume flow.

In the embodiment of Fig. 4 the valve members 98 and 99 are so mounted on the valve stem 89 that they are at different distances from their respective valve seats, so that valve member 99 will close its port 103 before valve member 98 closes its port 102. The difference in the spacing of the valve members 98 and 99 from their respective ports is so selected that in all intermediate positions the quantity of liquid flowing through the housing is the same or nearly so as when the valve members are in their extreme positions, i. e., the quantity flowing through the housing when valve member 100 engages its seat and ports 102 and 103 are wide open and when ports 102 and 103 are closed and valve member 100 is in wide open position is the same approximately as when the valve members are all in intermediate, partly opened, position. This may be effected in the following manner:

Assuming a desired predetermined constant flow of liquid through the housing, a graph 120 (see Fig. 5) is drawn for the flow of liquid through the port 105 as valve member 100 moves from its closed to its wide open position, the flow when said valve member 100 is closed being obviously zero and the valve member and port being so constructed that when member 100 is in its wide open position the aforesaid predetermined flow is provided, said graph thus being tangent to the horizontal graph line 121 representing the constant volume flow desired. A graph 122 is then drawn for the flow of liquid through the port 102 as valve member 98 moves from its closed position to wide open position, and a second graph 123 is drawn to correspondingly indicate the quantity of flow through port 103 as valve member 99 moves from its closed to wide open position, said two valve members and ports being so constructed that in wide open position the sum of the flow through the two ports equals the aforesaid predetermined flow designated by horizontal line 121. By moving the zero points of the last two named graphs 122 and 123 along the base line a position can be found wherein the sum of the ordinates of these two graphs 121 and 122, for any particular point on the base line, are equal to, or substantially equal to, the difference in the ordinates at that point between the horizontal line 121 denoting the constant volume flow and the corresponding ordinate on the graph 120 for the valve member 100. In other words, in this position of the two graphs for the valve members 98 and 99 the sum of the ordinates for the three graphs 120, 122 and 123 denoting performance of the three valve members 98, 99 and 100 at point 12.5% open and which are respectively designated A, C and B will substantially equal the ordinate D of the horizontal line 121 denoting the intended constant volume flow. The difference in the positions of the abscissae where the two curves 122 and 123 denoting performance of valve members 98 and 99 intersect the base line determines the difference which must exist in the time of closing of valves 98 and 99, and therefore the difference in the spacing of said valve members from their respective seats which must exist, if substantially constant volume flow is to be maintained. Such is schematically illustrated in the embodiment of Fig. 4 by valve member 99 being appreciably nearer its port 103 than is valve member 98 to its port 102, and as valve member 99 may slide within its port, said port may be made of sufficient length axially so that said port is closed from the time valve member 99 enters one end of the port until and including the time when valve member 98 engages its seat and closes its corresponding port.

While in the illustrated embodiment the control of the by-pass is effected by two valve members closing their ports at different times, the two valves closing at different times may be applied equally well to the control of the flow through the radiator, in which event graph 120 would designate the by-pass flow and graphs 122 and 123 would designate the performance of the two valves in the main line through the radiator.

The effective area of the valve member 100 when closed is equated with the effective area of the movable end wall of chamber 92 in the construction shown in Figs. 3 and 4, so that even when valve member 100 is closed the downward pressure on valve member 100, as viewed in the drawings, is the same as that existing on the movable end wall 91 when valve member 100 is open. As in the embodiment of Fig. 2, the effective areas of the movable end walls of chambers 87 and 92 are equated and hence the balancing function heretofore explained is equally obtained in this embodiment. In this embodiment the thermostat 87 is subjected to the temperature of the cooling medium whether the main valve 100 is open or closed, and therefore no leakage provision is required.

The embodiment of Fig. 4 shows an alternative structure for introducing the safety feature described in conjunction with the embodiment of Fig. 2, operating on the same principle but differing in detail. As here shown, the sleeve 97 is slidably mounted on stem 89 and fixedly attached, as by a threaded connection, to a sleeve 107 also slidably mounted on the valve stem 89. The inner end of sleeve 107 is provided with a beveled surface 108 to provide a cam, and one or more balls 109 are mounted in apertures in the wall of the bore of stem 89 normally locked in engagement with the cam surface 108 by a block of fusible metal 110. Surface 108 is held in contact with the ball or balls 109 by a coil spring 111 interposed between the valve member 98 and the movable end wall 86 of thermostat 87. If the temperature rises sufficiently to melt the block 110, or soften it sufficiently, the balls are cammed inwardly into the melted or softened metal by the action of coil spring 111 transmitted to the sleeve 107 through valve member 98 and to the cam surface 108 in engagement with said balls. Thereby sleeve 97 is rendered free to slide on the valve stem 89 and, under the action of spring 111, the valve members 98 and 99 are moved to close the by-pass ports and valve 100 is moved to its wide open position.

Figure 5:
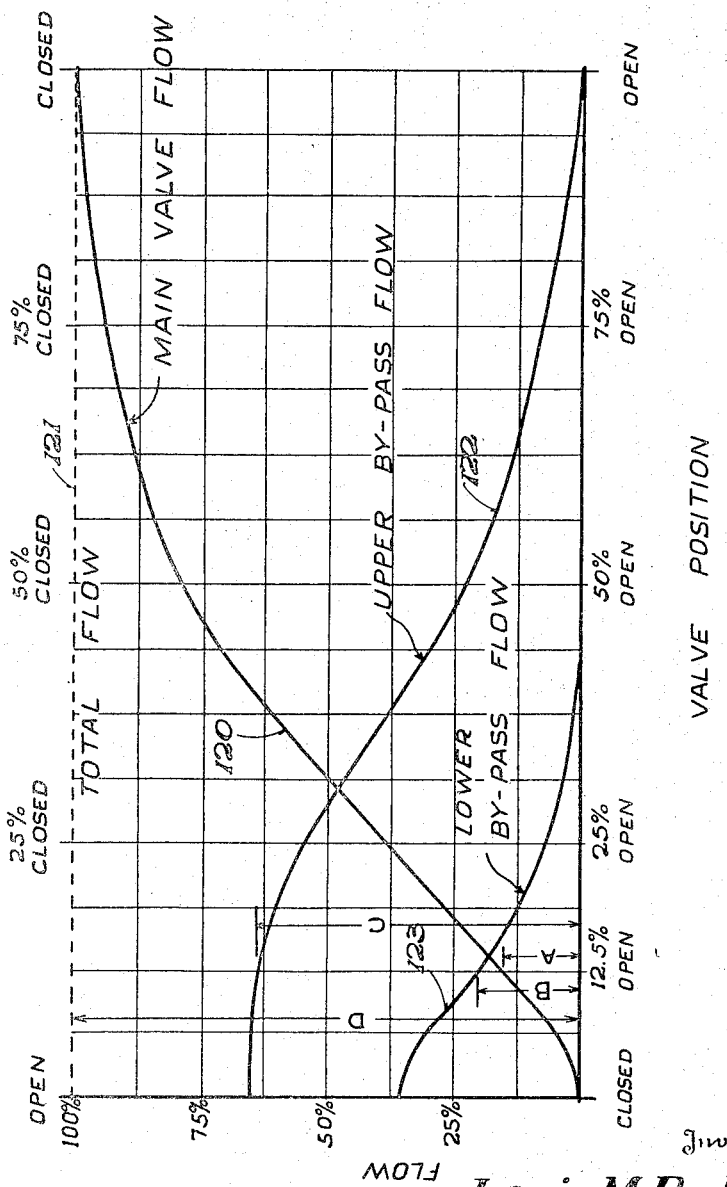
Fig. 5 is a diagram to be explained.

As illustrated by graph 120 in Fig. 5, for approximately 50% of the stroke of the valve member the flow is substantially proportional to the extent of valve opening. In other words, approximately the first 50% of the flow when plotted against the opening of the valve gives a graph which is substantially a straight line. If the stroke of the valve is short enough in comparison with the effective area of the valve, the valve can be made to operate substantially upon this straight line portion of the graph. Hence it is possible to obtain a substantially constant total flow by using relatively large valves having relatively short strokes, so that if the valves are so constructed that when they cause all of the liquid to flow through the by-pass the flow is substantially the same as when they cause all of the liquid to flow through the main line or radiator, in intermediate positions wherein the valves are partly open their total or combined flow through the by-pass and the main line or radiator is substantially the same as when liquid is flowing through either one of these valves alone.

The embodiment of Fig. 6 illustrates the present invention incorporated in a structure having the compensating feature and the safety feature heretofore referred to but using only a single main valve and a single by-pass valve which by reason of the relationship of their effective areas to the length of their strokes will produce a substantially constant volume of liquid flow as above explained.

In the form shown in Fig. 6, the regulator again includes a housing which may be composed of any suitable number of parts but is shown as having a central section 130 provided in any suitable way with a nipple 131 for connection to the by-pass, an end section 132 provided in any suitable way with a nipple 133 for connection to the water line and constituting the inlet to the housing, and an end section 134 provided in any suitable way with a nipple 135 for connection to the water line and providing an outlet for the housing. Said housing sections may be connected in any suitable way, as by a plurality of bolts or screws 136, and suitable packing as shown at 137 may be interposed to prevent leakage.

Mounted in any suitable way in the housing section 132 is a thermostat of any suitable size and construction, and here shown as in the form of an expansible and collapsible chamber defined by a corrugated tubular metal wall or bellows 138 provided with a stationary end wall 139 which is fixedly attached in position in the housing, as by a threaded boss 140 extending through an aperture 141 in a bridge 142, formed integrally with or attached to the housing section 132, and locked in position as by the nut 143. The opposite movable end wall 144 closing the opposite end of the chamber 145 of said thermostat, and which chamber is charged with any suitable thermosensitive fluid, preferably a volatile liquid partially filling said chamber as heretofore explained, has attached thereto in any suitable way a stem 146. As here illustrated stem 146 carries a guide pin 147 slidably engaged with the bore 148 of the guide post or stop member 149 projecting from the end wall 139 and here shown as formed integrally with the threaded boss 140.

Stem 146, as here shown, is provided with exterior threads, and is threadedly received within the internally threaded bore 150 of stem 151 threadedly attached at 152 to a boss or stem 153 projecting from the movable end wall 154 of the compensating vessel 155, which is partially evacuated but with a charge of air or suitable inert gas, said movable end wall 154 having substantially the same effective area as the movable end wall 144 of said thermostat and said compensating vessel having the construction, function and manner of operation as heretofore explained in detail in connection with the other embodiments. Said compensating vessel 155 has a stationary end wall 156 mounted in any suitable way, as by a threaded boss 157 projecting through an aperture 158 in a bridge 159 attached to or formed integrally with the housing section 134 and locked in position by a nut 160.

Slidably mounted on the stem 151 is a sleeve 161 which carries adjacent its opposite end, as by internal threads, a locking sleeve 162 having a beveled surface 163 at its inner extremity. The wall of the hollowed portion of the stem 151 has one or more apertures 164 in which are disposed balls 165 held in their outer position in contact with the beveled surface 163 by a plug 166 of metal which will melt or soften if the temperature of the liquid under control reaches a dangerous degree.

Mounted on the sleeve 161, as by arms 167 is a by-pass valve member in the form of a sleeve 168 flanged to provide a conical seating surface 169. The effective area of said flanged end of member 168 is preferably substantially the same as the effective areas of the movable end walls of the thermostat 145 and the compensating vessel 155 so that when the latter is shielded from the liquid pressure by the position of the valve member 168 the compensating action is still obtained as above explained. Threadedly mounted at the inner end of the housing section 132 is a valve seat member 170 adapted to make line contact with said surface 169. The opposite end of valve member 168 is shown as beveled at 171 to make seating contact with a beveled surface 172 on a seating member 173 suitably mounted, as by threads, in an aperture 174 in an internal partition 175 of the housing section 130. Partition 175 has a second and aligned aperture 176 in which is suitably mounted, as by threads, a guide member 177 for slidably receiving and guiding the tubular valve member 168.

Interposed between the movable end wall 144 of the thermostat and a suitable seat provided on the valve member 168, here shown as provided in the arms 167, is a coil spring 178 reacting between the movable end wall on said thermostat and said tubular valve member so as to tend to urge the latter toward the right, as viewed in the drawings, said tubular valve member with its sleeve 161 being normally locked against movement on the stem 151 by the interengagement between the balls 165, the plug 166 and the locking ring 162.

In operation, the cooling liquid enters the housing through the opening in nipple 133, and if said liquid is cold, as it will be normally at the beginning of operation, the thermostat 145 is contracted and valve member 168 is held in contact with seat 170 whereby the liquid will flow through the interior of said valve member 168 and out through the by-pass opening provided by nipple 131. As the liquid rises in temperature the thermostat 145 will expand moving the valve member 168 toward the right as viewed in the drawing to permit flow through the port provided by the seat 170 while simultaneously advancing the beveled end 171 of said valve member 168 toward its seat 172 on the member 173. Continued rise of the temperature will eventually cause the end 171 of valve member 168 to engage its seat 172 on member 173, in which position flow through the by-pass is stopped and valve member 168 is in its most remote position from its seat 170, whereby all of the liquid will flow through the outlet to the radiator provided by the nipple 135.

If at any time the thermostat should become inoperative so that the temperature of the liquid rises to a dangerous degree, such temperature will cause the plug 166 to soften or melt, whereby the balls 165 may be cammed inwardly into the chamber in the hollowed portion of the stem 151 by the action of the beveled extremity of ring 162 on said balls, whereby the sleeve 161 is free to slide on the stem 151, and the coil spring 178 will thereupon move valve member 168 to its extreme open position, causing the by-pass to be completely closed and all of the liquid to flow through the outlet provided by the nipple 135.

The effective area of movable end wall 154 of compensating vessel 155 is equated as to effective area of the movable end wall 144 of the thermostat 145 so that said compensating vessel will cooperate with said thermostat to balance out fluctuations in the temperature of the liquid either caused by variations of pressure due to altitude or variations of pressure in the liquid itself, and when the compensating vessel 155 is shielded by the valve member 168, the same action is obtained because of the opposed pressure acting on the movable end wall 144 and the flanged end of valve member 168 having the same effective area.

Owing to the large effective area of the valve ports and the relatively short stroke required to effect maximum opening or closing, the volume of flow of the liquid remains substantially constant whether valve member 168 is in engagement with its seat 170, or whether said valve member is in engagement with its seat 172, or whether it is in any intermediate position, as above explained.

It will therefore be perceived that by the present invention a temperature regulator has been provided wherein the movement of the valve members in controlling alternative flow through a by-pass or the radiator is determined only by the temperature at the thermostat irrespective of what fluctuation in pressure may occur in the cooling medium, whether due to variations in altitude or variations in the operation of the cooling system. Moreover, the aforesaid result may be combined with such an operation of the thermostatically controlled valves as to assure a substantially constant volume of flow through, and therefore pressure drop across, the regulator housing. Furthermore, these results have been obtained in a structure which is relatively simple and compact, highly efficient in operation, and which may be manufactured and installed at a relatively low cost.

While the embodiments of the invention illustrated on the drawings have been described with considerable particularity, it is to be expressly understood that the invention is not restricted thereto, as the same is capable of receiving a variety of mechanical expressions, some of which will now readily suggest themselves to those skilled in the art, while changes may be made in the details of the component elements, as in the matters of size, relationship, etc., and certain features used without other features without departing from the spirit of this invention. The novel safety feature provided by the present invention is of utility in regulators for vehicles or installations operating only at the surface of the earth as well as at any altitude above the surface of the earth. The provision for maintaining constant volume flow may be used with or without the balancing of variations in pressure, and the compensation for variations in pressure can be used with or without the maintenance of a constant volume flow, and while both are of particular utility in conjunction with airplane service because of the difficulties introduced as a result of fluctuating air pressures, the present invention may be used in other installations where variations of pressure in the cooling medium for one reason or another or variations in volume flow are to be eliminated. Reference is therefore to be had to the appended claims for a definition of this invention.

What is claimed is:

1. A temperature regulator of the type employing thermostatically controlled valve mechanism for predetermining the flow of medium through either or both of a main line and a by-pass and in combination with a thermostat subjected to the temperature of said medium and including an expansible and collapsible chamber having a movable end wall responsive to variations in the pressure acting exteriorly on said thermostat, means providing main and by-pass ports, a pressure responsive member operatively connected to said thermostat in opposing relation thereto, said thermostat and said pressure responsive member being respectively disposed on opposite sides with respect to one of said ports so that when said port is closed one of said thermostat and said pressure responsive member is shielded from the pressure acting on the other, said pressure responsive chamber including a partially evacuated, gas-charged, expansible and collapsible chamber having a movable end wall provided with an effective area which is equal to the effective area of the movable end wall of said thermostat, and main and by-pass valve mechanism operatively connected to the movable end walls of said thermostat and pressure responsive member and including a valve member cooperating with said port separating said thermostat and said pressure responsive member and having an effective area equal to that of the movable end walls of said thermostat and said pressure responsive member.

2. A temperature regulator of the type employing thermostatically controlled valve mechanism for predetermining the flow of medium through either or both of a main line and a by-pass and in combination with a thermostat subjected to the temperature of said medium and including an expansible and collapsible chamber having a movable end wall responsive to variations in the pressure acting exteriorly on said thermostat, means providing main and by-pass ports, a pressure responsive member operatively connected to said thermostat in opposing relation thereto, said thermostat and said pressure responsive member being respectively disposed on opposite sides with respect to one of said ports so that when said port is closed one of said thermostat and said pressure responsive member is shielded from the pressure acting on the other, said pressure responsive chamber including a partially evacuated, gas-charged, expansible and collapsible chamber having a movable end wall provided with an effective area which is equal to the effective area of the movable end wall of said thermostat, and main and by-pass valve mechanism operatively connected to the movable end walls of said thermostat and pressure responsive member and disposed therebetween in axial alignment therewith, one of said main and by-pass valve mechanisms including a single member and the other including a pair of members and said single member cooperating with said port separating said thermostat and said pressure responsive member and having an effective area equal to that of the movable end walls of said thermostat and said pressure responsive member.

3. In a temperature regulator for internal combustion engines of the type employing thermostatically controlled valve mechanism for predetermining the flow of cooling medium through either or both of a radiator and a by-pass therearound, and in combination with a thermostat subjected to the temperature of said medium and responsive to variations in the pressure thereof, main and by-pass valve mechanism attached to said thermostat, one of said valve mechanisms comprising a single valve member and the other valve mechanism comprising two valve members, ported members cooperating with each of said valve members, and a pressure responsive compensating member attached to said valve members in opposition to said thermostat and having the same effective area as said thermostat, the two valve members of said second named valve mechanism being disposed at different distances from their ported members when open by an amount such as to provide a total flow of cooling medium through all three valve ports when said valve ports are partly open approximately equal to the flow through the port of said single valve member when only said single valve member is open.

4. In a temperature regulator for an internal combustion engine of the type employing a radiator and a by-pass around said radiator and a thermostatic regulator for predetermining the flow of cooling medium through either or both of said radiator and said by-pass including a thermostat subjected to the temperature of the cooling medium and main and by-pass valve mechanism connected to said thermostat, one of the valve mechanisms including a pair of valve members and the other valve mechanism including a single valve member and ported members co-operating with the respective valve members, the two members of the first-named valve mechanism being positioned at different distances from their ported members when open whereby one of said valve members will close its port ahead of the other.

5. In a temperature regulator for an internal combustion engine of the type employing a radiator and a by-pass around said radiator and a thermostatic regulator for predetermining the flow of cooling medium through either or both of said radiator and said by-pass including a thermostat subjected to the temperature of the cooling medium and main and by-pass valve mechanism connected to said thermostat, one of the valve mechanisms including a pair of valve members and the other valve mechanism including a single valve member and ported members co-operating with the respective valve members, the two members of the first named valve mechanism being positioned at different distances from their ported members when open whereby one of said valve members will close its port ahead of the other, and a member connected to and co-operating with said thermostat for compensating for fluctuations of pressure in the cooling medium acting on said thermostat.

6. In a temperature regulator for predetermining the flow of medium through either or both of a main line and a by-pass including a thermostat subjected to the temperature of the medium and main and by-pass valve mechanism connected to said thermostat, one of said valve mechanisms including a single valve member and the other of said valve mechanisms including a pair of valve members and ported members co-operating with said respective valve members, the two valve members of said last named valve mechanism being positioned at different distances from their ported members when open by an amount such that for any open position thereof the total flow of liquid past said valve members when added to the then flow of liquid past said first named valve member shall approximately equal the total amount of flow past said first named valve member when wide open.

7. In a temperature regulator for predetermining the flow of medium through either or both of a main line and a by-pass including a thermostat subjected to the temperature of the medium and main and by-pass valve mechanism connected to said thermostat, one of said valve mechanisms including a single valve member and the other of said valve mechanisms including a pair of valve members and ported members co-operating with said respective valve members, the two valve members of said last named valve mechanism being positioned at different distances from their ported members when open by an amount such that for any open position thereof the total flow of liquid past said valve members when added to the then flow of liquid past said first named valve member shall approximately equal the total amount of flow by said first named valve member when wide open, and compensating means co-operating with said thermostat to balance out fluctuations of pressure in the medium acting on said thermostat.

8. In a temperature regulator of the type employing thermostatically controlled valve members for predetermining the flow of medium through either or both of a main line and a by-pass, and in combination with a thermostat subjected to the temperature of said medium and responsive to variations in the pressure acting exteriorly on said thermostat, main and by-pass valve mechanism attached to said thermostat, said valve mechanism comprising a single movable valve member, valve seat members co-operating with the opposite ends of said movable valve member, and a pressure responsive compensating member attached to said movable valve member in opposition to said thermostat and having the same effective area as said thermostat.

9. In a temperature regulator of the type employing thermostatically controlled valve members for predetermining the flow of medium through either or both of a main line and a by-pass, and in combination with a thermostat subjected to the temperature of said medium and responsive to variations in the pressure acting exteriorly on said thermostat, main and by-pass valve mechanism attached to said thermostat, said valve mechanism comprising a single movable valve member, valve seat members co-operating with the opposite ends of said movable valve member, and a pressure responsive compensating member attached to said movable valve member in opposition to said thermostat and having the same effective area as said thermostat, said single movable valve member having an effective area that is substantially the same as said thermostat and said compensating member.

10. In a temperature regulator of the type employing thermostatically controlled valve members for predetermining the flow of medium through either or both of a main line and a by-pass, and in combination with a thermostat subjected to the temperature of said medium and responsive to variations in the pressure acting exteriorly on said thermostat, main and by-pass valve mechanism attached to said thermostat, said valve mechanism comprising a single movable valve member, valve seat members co-operating with the opposite ends of said movable valve member, and a pressure responsive compensating member attached to said movable valve member in opposition to said thermostat and having the same effective area as said thermostat, said single valve member having a relatively short stroke and relatively large effective valve openings so proportioned as to provide a total flow of medium when both valves are partly open which is substantially equal to the flow permitted when either one of said valves is open and the other closed.

11. In a temperature regulator for predetermining the flow of medium through either or both of a main line and a by-pass including a thermostat subjected to the temperature of said medium and main and by-pass valve mechanism connected to said thermostat, said valve mechanism including a single tubular valve member, and valve seats adapted to co-operate with the opposite ends of said tubular valve member, the effective area of the valve openings provided by the co-operation of said valve member with said valve seats being relatively large as compared to the stroke of said valve member and so proportioned that a substantially constant volume of liquid flow is maintained in all positions of said valve member.

LOUIS M. PUSTER.

REFERENCES CITED

The following references are of record in the file of this patent:

UNITED STATES PATENTS

| Number | Name | Date |
|---|---|---|
| 2,212,343 | Goehring | Aug. 20, 1940 |
| 1,153,681 | Fulton | Sept. 14, 1915 |
| 2,028,149 | Goldsmith | Jan. 21, 1936 |

(References on following page)

| Number | Name | Date |
|---|---|---|
| 1,011,587 | Cromley | Dec. 12, 1911 |
| 1,400,925 | Wolf | Dec. 20, 1921 |
| 1,952,516 | Sperry | Mar. 27, 1934 |
| 2,055,280 | Dodson | Sept. 22, 1936 |
| 2,202,705 | Martin-Hurst | May 28, 1940 |
| 1,000,435 | Pagelsen | Aug. 15, 1911 |
| 1,208,130 | Fulton | Dec. 12, 1916 |
| 1,787,215 | Sinclair | Dec. 30, 1930 |
| 1,900,221 | Beardsley | Mar. 7, 1933 |
| 1,847,911 | Trane | Mar. 1, 1932 |
| 1,980,310 | Ames | Nov. 13, 1934 |
| 2,193,581 | Clokey | Mar. 12, 1940 |
| 2,225,210 | Dillon | Dec. 17, 1940 |
| 2,308,861 | Clifford | Jan. 19, 1943 |
| 1,289,963 | Thomson | Dec. 31, 1918 |
| 1,327,148 | Druar | Jan. 6, 1920 |
| 1,403,493 | Furber | Jan. 17, 1922 |

FOREIGN PATENTS

| Number | Country | Date |
|---|---|---|
| 551,386 | France | Jan. 8, 1923 |
| 555,509 | Germany | Jan. 30, 1930 |

OTHER REFERENCES

Sarco, Catalog Sheet A. I. A. File 29–D21 Sarco No. 140, June, 1936 (2 pages).